United States Patent
Amagata (10) Patent No.: US 10,293,429 B2
(45) Date of Patent: May 21, 2019

(54) QUALITY CHECK SYSTEM OF SPOT WELDING

(71) Applicant: FANUC CORPORATION, Minamitsuru-gun, Yamanashi (JP)

(72) Inventor: Yasuhiro Amagata, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 110 days.

(21) Appl. No.: 15/137,289

(22) Filed: Apr. 25, 2016

(65) Prior Publication Data

US 2016/0318117 A1    Nov. 3, 2016

(30) Foreign Application Priority Data

Apr. 28, 2015  (JP) .................................. 2015-091984

(51) Int. Cl.
*B23K 11/11* (2006.01)
*B23K 11/25* (2006.01)
(Continued)

(52) U.S. Cl.
CPC ............. *B23K 11/25* (2013.01); *B23K 11/115* (2013.01); *B23K 11/253* (2013.01);
(Continued)

(58) Field of Classification Search
CPC ..... B23K 11/25; B23K 11/252; B23K 11/253; B23K 11/251; B23K 11/255;
(Continued)

(56) References Cited

U.S. PATENT DOCUMENTS

| | | | |
|---|---|---|---|
| 4,419,558 A | 12/1983 | Stiebel | |
| 5,764,859 A * | 6/1998 | Kim | ..................... B23K 11/252 |
| | | | 219/109 |

(Continued)

FOREIGN PATENT DOCUMENTS

| | | |
|---|---|---|
| DE | 3241897 C2 | 4/1987 |
| JP | 2000-005882 A | 1/2000 |

(Continued)

OTHER PUBLICATIONS

Japanese Office Action with English language translation for Application No. 2015-091984, dated May 11, 2017, 8 pages.

*Primary Examiner* — Tu B Hoang
*Assistant Examiner* — Erin E McGrath
(74) *Attorney, Agent, or Firm* — RatnerPrestia (57) ABSTRACT

A spot welding quality check system, which can be easily used and can be adapted to various situations. The check system has: a pair of electrodes configured to move toward or away from each other and apply current to a workpiece while pressurizing the workpiece; a displacement detecting part which detects an amount of displacement between the electrodes during spot welding; a checking part which estimates as to whether welding quality is good or poor by using an inner function, based on the detected amount of displacement; a correction receiving part which receives a correction by an operator regarding the estimated welding quality; and a learning part which updates the inner function based on an estimation result when the correction receiving part does not receive the correction, and updates the inner function based on a content of the correction when the correction receiving part receives the correction.

3 Claims, 5 Drawing Sheets (51) Int. Cl.
  *B23K 11/31* (2006.01)
  *B23K 11/30* (2006.01)
  *B23K 31/12* (2006.01)

(52) U.S. Cl.
  CPC .......... *B23K 11/3009* (2013.01); *B23K 11/31* (2013.01); *B23K 31/125* (2013.01)

(58) Field of Classification Search
  CPC ... B23K 11/256; B23K 11/257; B23K 11/258; B23K 9/095; B23K 9/0953; B23K 9/0956; B23K 31/125
  USPC ............. 219/91.1, 86.1, 86.33, 86.41, 86.51, 219/86.61, 86.7, 90, 91.2
  See application file for complete search history.

(56) References Cited

U.S. PATENT DOCUMENTS

| | | | | |
|---|---|---|---|---|
| 5,814,783 A | * | 9/1998 | Harville | B23K 11/02 219/109 |
| 5,898,285 A | * | 4/1999 | Nagasawa | B23K 11/315 219/86.7 |
| 6,232,572 B1 | * | 5/2001 | Kanjo | B23K 11/115 219/110 |
| 2001/0015346 A1 | * | 8/2001 | Kanjo | B23K 11/253 219/109 |
| 2003/0234239 A1 | * | 12/2003 | Lee | B23K 11/24 219/109 |
| 2011/0180518 A1 | * | 7/2011 | Hasegawa | B23K 11/115 219/108 |
| 2012/0118861 A1 | * | 5/2012 | Haeufgloeckner | B23K 11/11 219/91.1 |
| 2015/0069112 A1 | * | 3/2015 | Abou-Nasr | B23K 31/125 228/102 |

FOREIGN PATENT DOCUMENTS

| | | |
|---|---|---|
| JP | 2001-300738 A | 10/2001 |
| JP | 2002316270 A | 10/2002 |
| JP | 2013121616 A | 6/2013 |

* cited by examiner

QUALITY CHECK SYSTEM OF SPOT WELDING

BACKGROUND OF THE INVENTION

1. Field of the Invention

The present invention relates to a quality check system for judging as to whether welding quality of a spot welding is good or poor.

2. Description of the Related Art

In spot welding for carrying out resistance welding by pressurizing an object to be welded by using an electrode, welding quality of the spot welding cannot be checked by an appearance of the object. In the prior art, various methods have been proposed as methods for checking welding quality (for example, a method of monitoring a displacement between electrodes, a method of using a voltage or resistance between electrodes, a method of using a ultrasonic wave, a method of measuring the temperature, and a method of using an acoustic emission, etc.)

Among the above methods, the method of monitoring the displacement between the electrodes can be utilized for checking the welding quality of various kinds of material, since an error due to split-flow of welding current does not occur in the method. As a relevant prior art document, JP 2001-300738 A discloses a method of: measuring a degree of thermal expansion of a material to be welded by using an amount of displacement of a value of an encoder attached to an actuator when current is applied to the actuator; measuring a degree of contraction of the material by using an amount of displacement of a value of the encoder before and after current is applied to the actuator; and checking welding quality based on the degree of thermal expansion and the degree of contraction.

Further, JP 2000-005882 A discloses two types of methods for judging welding quality. In the first method, data of a displacement between electrodes when welding quality is good is previously obtained as reference data; and data of displacement between the electrodes during welding after a certain time point is compared to the reference data so as to check the welding quality. In the second method, a saturation point of thermal expansion due to the welding is calculated based on data of displacement between the electrodes during welding; an expansion velocity, an amount of saturated thermal expansion, an expansion time and a contraction time of an object to be welded are calculated based on the saturation point; and these calculated values are respectively compared to an expansion velocity, an amount of saturated thermal expansion, an expansion time and a contraction time, which are previously stored as an ideal model, so as to check welding quality.

In the method of JP 2001-300738 A, if the pressurizing force is purposely changed when applying current, the degree of thermal expansion or contraction cannot be measured. Further, since the degree of thermal expansion or contraction may be changed depending on a material or thickness of the object to be welded, it is necessary to change a parameter for checking welding quality for every welding point.

In the first method of JP 2000-005882 A, it is necessary to adjust two parameters, i.e., a time point and a threshold of deviation. Therefore, it is difficult to determine as to which parameter should be adjusted when a problem in welding quality occurs at a production field. Further, it is necessary to adjust these parameters depending on the material or thickness of the object to be welded.

On the other hand, in the second method of JP 2000-005882 A, in case that the pressurizing force is changed when applying current, the expansion velocity, the amount of saturated thermal expansion, the expansion time and the contraction time cannot be measured. Further, since the degree of thermal expansion or contraction may be changed depending on the material or thickness of the object to be welded, it is necessary to change the threshold with respect to an ideal model for every welding point.

In some cases, a welding machine for carrying out adaptive control may be used, in which current is changed when applying the current. In this case, a waveform of an encoder value when applying the current may be different even between the same welding points of a plurality of the same type of objects to be welded. Therefore, a parameter (or threshold) for checking welding quality cannot be set to a severe value, resulting in that bad or poor welting quality may be overlooked.

As explained above, the prior art includes following three major problems.

(1) Since an evaluation is not carried out based on continuous data, an amount of evaluation cannot be correctly measured in case that the pressurizing force is changed when applying current.

(2) Since it is necessary to adjust the parameter with respect to every welding point, such an adjustment is burdensome.

(3) in the welding machine in which current is adaptively changed when applying the current, the parameter or threshold for checking welding quality cannot be set to a severe value, resulting in that criteria for checking the welding quality may be lenient (even "bad" or "poor" welting quality may be judged as "good").

SUMMARY OF THE INVENTION

An object of the present invention is to provide a spot welding quality check system, which can be easily used and can be adapted to various situations.

According to the present invention, a spot welding quality check system for checking welding quality of spot welding is provided, the system comprising: a pair of electrodes which apply current to an object to be welded while pressurizing the object; a displacement detecting part which detects an amount of displacement between the pair of electrodes during spot welding is carried out; a checking part which estimates as to whether spot welding quality is good or poor by using an inner function, based on the amount of displacement between the pair of electrodes detected by the displacement detecting part; a correction receiving part which receives a correction by an operator with respect to as to whether the spot welding quality is good or poor estimated by the checking part; and a learning part which updates the inner function based on an estimation result by the checking part when the correction receiving part does not receive the correction by the operator, and updates the inner function based on a content of the correction by the operator when the correction receiving part receives the correction by the operator.

In a preferred embodiment, the spot welding quality check system further comprises: an actuator which drives at least one of the pair of electrodes; and an encoder which detects an amount of driving of the actuator, wherein the encoder is used as the displacement detecting part.

In a preferred embodiment, the spot welding quality check system further comprises a strain gauge attached to at least one gun arm for holding the pair of electrodes, wherein the strain gauge is used as the displacement detecting part.

In a preferred embodiment, the spot welding quality check system further comprises: an actuator which drives at least one of the pair of electrodes; and a driving force detecting part which detects a driving force of the actuator, wherein the checking part estimates as to whether the spot welding quality is good or poor by using the inner function, based on the amount of displacement between the pair of electrodes detected by the displacement detecting part and the driving force detected by the driving force detecting part.

BRIEF DESCRIPTION OF THE DRAWINGS

The above and other objects, features and advantages of the present invention will be made more apparent by the following description of the preferred embodiments thereof with reference to the accompanying drawings wherein.

DETAILED DESCRIPTION

Figure 1:
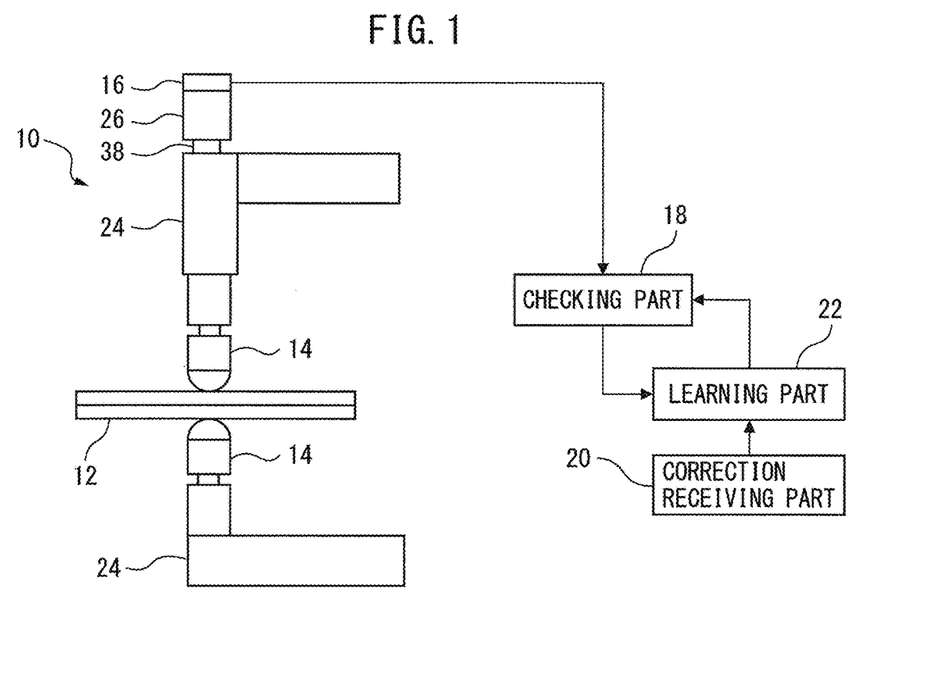
FIG. 1 shows a schematic configuration of a spot welding quality check system according to a first embodiment of the present invention.

FIG. 1 shows a schematic configuration of a spot welding quality check system 10 according to a first embodiment of the present invention. Check system 10 has: a pair of electrodes 14 configured to move toward or away from each other and apply current to an object (workpiece) 12 to be processed by spot welding while pressurizing workpiece 12; a displacement detecting part 16 which detects an amount of displacement between pair of electrodes 14 during spot welding is carried out; a checking part 18 which estimates as to whether spot welding quality is good or poor by using an inner function, based on the amount of displacement between the pair of electrodes detected by displacement detecting part 16; a correction receiving part 20, such as an I/O device, etc., which receives a correction by an operator with respect to as to whether the spot welding quality is good or poor estimated by checking part 18; and a learning part 22 which updates the inner function based on an estimation result by checking part 18 when correction receiving part 20 does not receive the correction by the operator, and updates the inner function based on a content of the correction by the operator when correction receiving part 20 receives the correction by the operator.

In the example of FIG. 1, pair of electrodes 14 are respectively attached or held by a pair of gun arms 24. One of electrodes 14 (in the illustrated example, the upper electrode) is movable in the vertical direction by an actuator such as a servomotor 26. In the example of FIG. 1, an encoder, attached to servomotor 26 and configured to detect a rotational angle position (or an amount of driving) of servomotor 26, may correspond to displacement detecting part 16.

Figure 2:
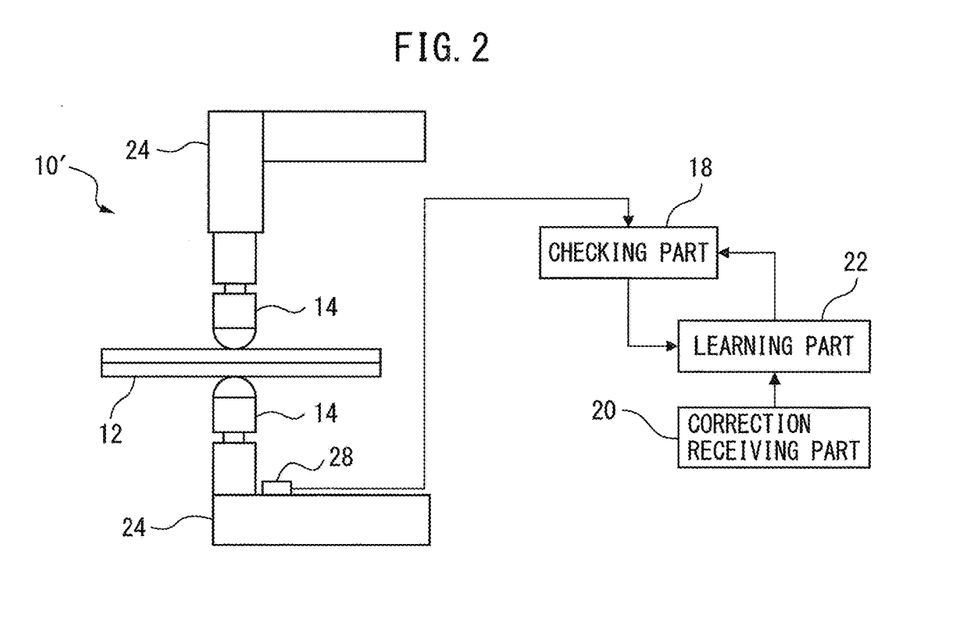
FIG. 2 shows a schematic configuration of a spot welding quality check system according to a second embodiment of the present invention.

FIG. 2 shows a schematic configuration of a spot welding quality check system 10' according to a second embodiment of the present invention. The second embodiment is adapted to obtain accurate data of the spot welding. Concretely, by attaching a strain gauge 28 to one of electrodes 24 (in the illustrated example, the lower electrode), the amount of displacement between electrodes 14 can be detected. In the second embodiment, gun arm 24 attached to electrode 14 or configured to hold electrode 14 may not be driven by the actuator. Even in such a case, the amount of displacement between the electrodes can be detected by strain gauge 28. In other words, in the second embodiment, strain gauge 28 may correspond to the displacement detecting part, and thus the amount of displacement between the electrodes can be accurately detected, regardless of the usage of the actuator, in comparison to the case that the encoder is used. The other components of the second embodiment may be the same as the first embodiment. Therefore, to the components of the second embodiment corresponding to the components of the first embodiment, the same reference numerals are added, and detailed explanations thereof will be omitted.

In the first and second embodiments, checking part 18, correction receiving part 20 and learning part 22 may be incorporated in a controller, etc., for controlling the spot welding, as a central processing unit (CPU), etc. Alternatively, checking part 18, correction receiving part 20 and learning part 22 may be arranged in the other place (for example, a cloud service).

Figure 3:
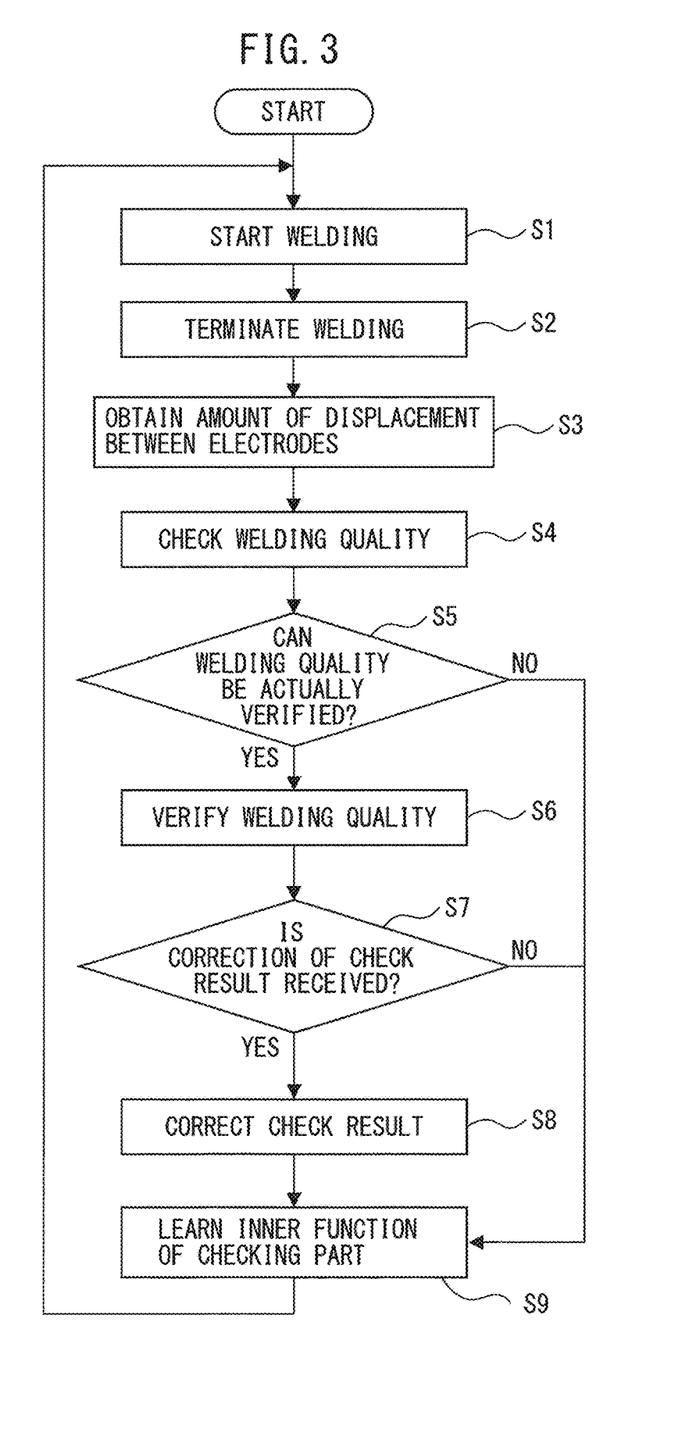
FIG. 3 is a flowchart explaining a procedure in the spot welding quality check system of the present invention.

Next, with reference to a flowchart of FIG. 3, the procedure of the spot welding quality check system of the present invention will be explained. First, based on a predetermined processing program, etc., spot welding with respect to workpiece 12 is carried out by using pair of electrodes 14 (steps S1 and S2).

Figure 4:
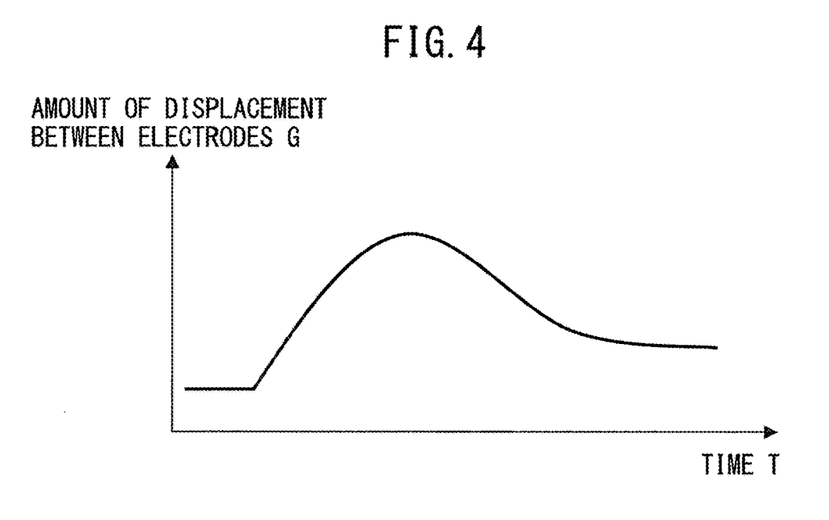
FIG. 4 is a graph showing an example of a temporal change in a displacement between electrodes in spot welding.

From start to finish of the spot welding, by using the displacement detecting part (encoder 16 or strain gauge 28) as described above, (time series data of) the amount of displacement between the electrodes during the spot welding is carried out is obtained (step S3). As a result, a relationship between time T and amount of displacement G between the electrodes is obtained, as exemplified in FIG. 4.

Figure 5:
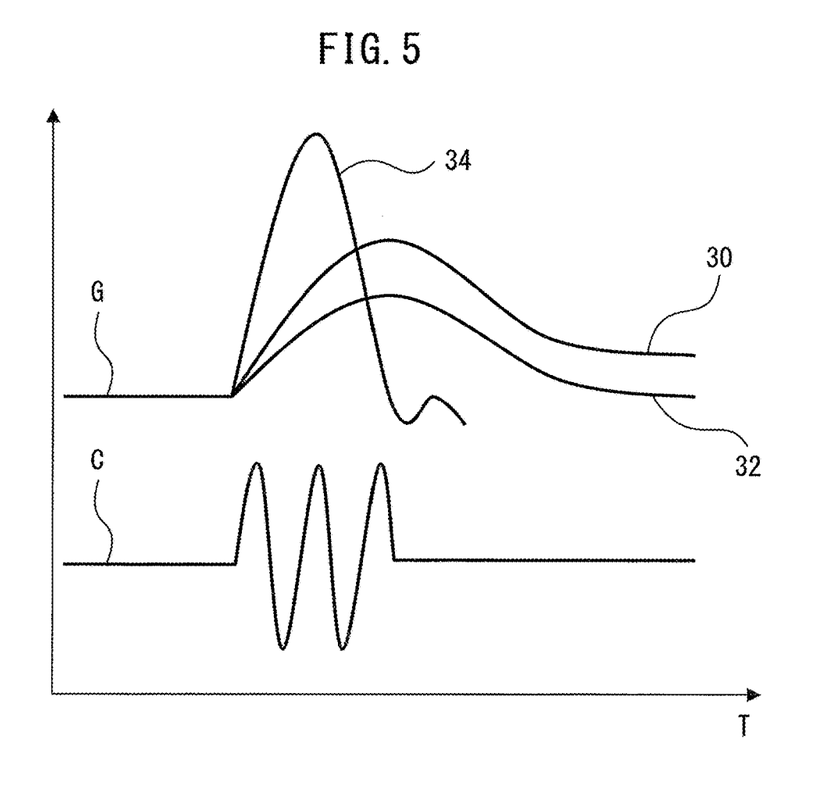
FIG. 5 is a graph showing a plurality of examples of a temporal change in a displacement between electrodes in spot welding, along with a graph showing welding current.

Next, based on the amount of displacement between the electrodes obtained in step S3, checking part 18 checks (or estimates) welding quality of the spot welding (step S4). Concretely, as shown in FIG. 5, amount of displacement G is known to be varied depending on the magnitude of welding current C. Amount of displacement G is represented by a graph 30 when welding current C is appropriate. On the other hand, amount of displacement G is represented by a graph 32 or 34, when welding current C is too small or large, respectively. In many cases, the welding quality becomes "good (or OK)" when the welding current is appropriate, while the welding quality becomes "poor (or NG)" when the welding current is inappropriate (too small or too large). Therefore, by analyzing the time series data of amount of displacement G, it can be judged or estimated as to whether the welding quality is good or poor. In addition, FIG. 5 shows that welding current C is alternate current, and the shapes of graphs representing the amount of displacement are generally the same as when the welding current is direct current.

In this regard, the time series data of the detected amount of displacement between the electrodes is input to an inner function of checking part 18, and checking part 18 and learning part 22 may utilize various methods used for "supervised learning," which is one of machine learning.

For example, the time series data may be input as the inner function, a multi-input single-output hierarchical neural network for outputting "good" or "poor" regarding the welding quality may be constituted, and various supervised learning methods (for example, back propagation or deep learning) may be applied to the hierarchical neural network as learning part 22. Alternatively, various supervised learning means, such as a Naive Bayes classifier or a support vector machine, may be used instead of the neural network.

Figure 6:
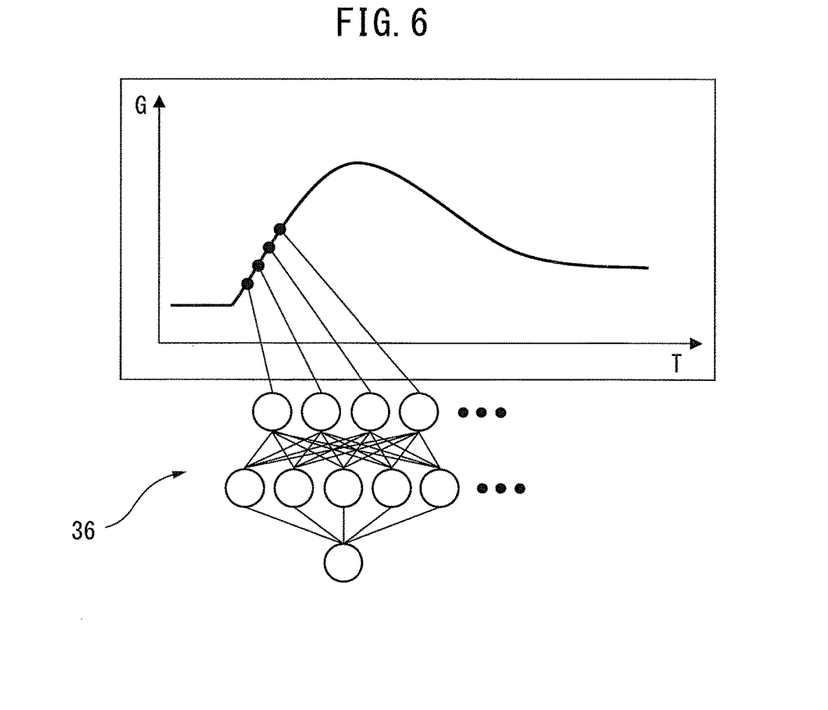
FIG. 6 shows an example in which a checking part (or inner function) is constituted by using a neural network.
Figure 7:
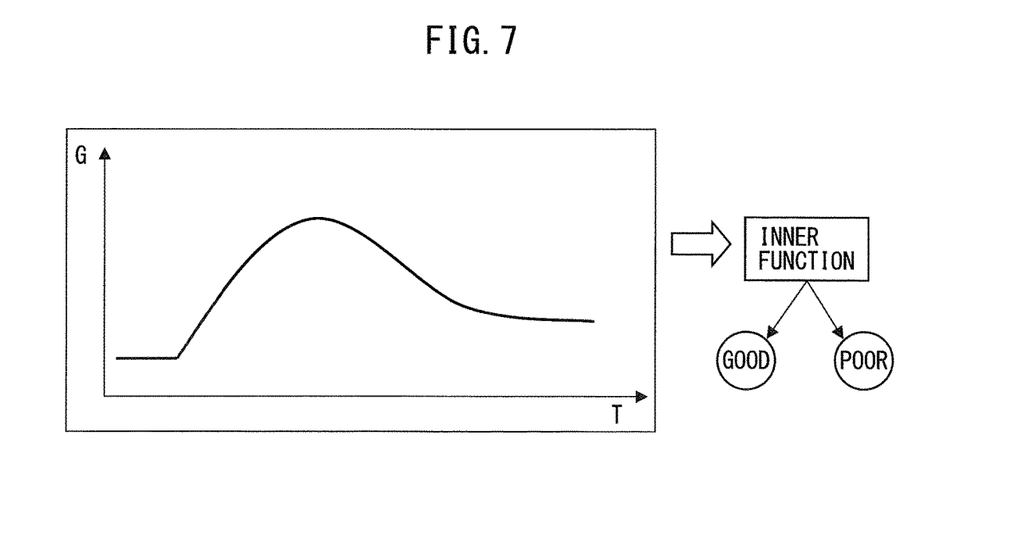
FIG. 7 shows an example in which the checking part (or inner function) outputs as to whether spot welding quality is good or poor based on input data regarding the displacement between the electrodes.

FIG. 6 shows an example in which the inner function is constituted by using the neural network. In this example, amount of displacement G between the electrodes is input to neural network 36 at every sampling period. However, the present invention is not limited as such, and the other various inner functions may be used. For example, time scaling (or normalization) may be carried out with respect to the data of amount displacement between the electrodes, and then, a parameter of the scaling and the data of the amount of displacement after the scaling may be input to the neural network. Accordingly, checking part 18 (or the inner function) outputs a check result (i.e., as to whether the welding quality is "good" or "poor"), based on the input data of the amount of displacement.

In this regard, as in the first embodiment of FIG. 1, when the check system has the actuator (for example, servomotor 26) for driving electrode 14, the check system may have a driving force detecting part, such as a force sensor 38, for detecting a driving force of the actuator. Otherwise, the driving force can be calculated from a current value of the servomotor, and in this case, a current sensor for measuring the current value of the servomotor corresponds to the driving force detecting part. As described above, when the driving force detecting part is provided, in addition to the data of the amount of displacement, the driving force of the actuator may also be input to checking part 18. Therefore, checking part 18 may judge that the welding quality is "poor" when the driving force represents an abnormal value, whereby checking performance of checking part can be improved.

With reference to FIG. 3 again, in the next step S5, it is judged as to whether the welding quality checked in step S4 can be actually verified by using information or means other than the amount of displacement between the electrodes. For example, when the welding quality of the actually spot welded workpiece can be verified (or judged) by chisel testing, etc., the chisel testing, etc., is carried out, separately from the check by checking part 18, in order to test the actual workpiece and judge as to whether the welding quality is "good" or "poor" (step S6).

Next, when the check (estimated) result by checking part 18 is different from the actually verified result, the operator corrects the check result of checking part 18 (steps S7 and S8). Concretely, the operator inputs the actually verified result to correction receiving part 20 so as to correct or change the check result of checking part 18. For example, even though spot welding is carried out at a certain condition and a check result at the same condition by checking part 18 is "good," the check result is corrected or changed to "poor" by the operator, when the actually verified welding quality is "poor." On the other hand, when the check result by checking part 18 is the same as the actually verified result, or when the welding quality cannot be actually verified, the operator does not correct the check result.

In the next step S9, when the check result is corrected via correction receiving part 20, learning part 22 learns (or updates) the inner function of checking part 18 based on the content of the correction. On the other hand, when the check result is not corrected, learning part 22 learns (or updates) the inner function of checking part 18 based on the check result by checking part 18. In other words, regardless of whether the check result is corrected or not, the welding quality ("good" or "poor") is learned with respect to the amount of displacement between the electrodes in the spot welding at the certain condition, and the learning result will be used to check welding quality in future spot welding.

As learning part 22, an algorithm depending on the structure of the inner function of checking part 18 is selected. For example, when a hierarchical neural network is used as the inner function, an algorithm (for example, back propagation or deep learning) for learning the neural network may be used as learning part 22. Alternatively, when a Naive Bayes classifier or a support vector machine is used as the inner function, an algorithm corresponding thereto may be used as learning part 22.

Figure 8:
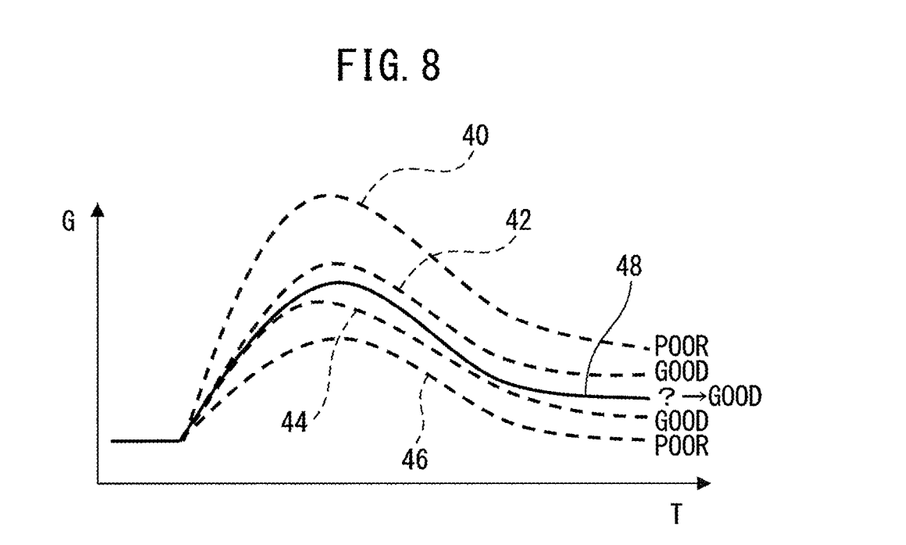
FIG. 8 is a graph explaining an example in which the welding quality of spot welding is checked by using a learning result of the inner function.

The above procedure from steps S1 to S9 is repeated at every time when spot welding is carried out. As a result, based on accumulated data of the amount of displacement between the electrodes, welting quality in newly performed spot welding can be appropriately checked (or estimated). For example, as shown in FIG. 8, graphs (or dashed lines) 40, 42, 44 and 46 indicate four patterns with respect to time series data of the amount of displacement between the electrodes, and each pattern is stored (or learned) and associated with welding quality ("good" or "poor") thereof. In this case, when the amount of displacement in newly performed spot welding is represented by a graph (or a solid line) 48, welding quality of the newly spot welding is checked (or estimated) as "good," since graph 48 is positioned between graphs 42 and 44, and the welding qualities of graphs 42 and 44 have been learned as "good."

As explained above, according to the present invention, the welding quality can be checked based on the continuous data of the amount of displacement when applying the current. Since the check result of the welding quality can be appropriately corrected in manner of a junk mail filter, the checking part properly learn the spot welding quality, whereby man-hours for adjusting a threshold or parameter can be eliminated or significantly reduced. Further, even in a spot welding machine in which current is adaptively changed during applying the current, criteria for checking the welding quality does not become lenient by carrying out the learning, whereby checking accuracy is improved.

According to the present invention, it can be judged as to whether the welding quality is good or poor by verifying the actual workpiece in chisel testing, etc., without adjusting a threshold, etc., and the verifying result can be directly learned to the system. Therefore, the checking accuracy of the spot welding quality can be easily improved.

While the invention has been described with reference to specific embodiments chosen for the purpose of illustration, it should be apparent that numerous modifications could be made thereto, by a person skilled in the art, without departing from the basic concept and scope of the invention.

The invention claimed is:

1. A spot welding quality check system for checking welding quality of spot welding, the system comprising:

a pair of electrodes which apply current and pressure to an object to be welded;

a displacement detector positioned to detect an amount of displacement between the pair of electrodes while spot welding is carried out;

an actuator which drives at least one of the pair of electrodes;

a driving force detector positioned to detect a driving force of the actuator; and a processor configured to:
  estimate whether spot welding quality is good or poor by using an estimation algorithm that continuously monitors the displacement between the pair of electrodes to generate a time-series of displacement samples, and compares the time-series of displacement samples to a time-series of reference samples to estimate whether spot welding quality is good or poor;
  set the estimate of the spot welding quality to poor when the driving force detected by the driving force detector is an abnormal value;
  when the processor receives a correction changing the estimate of the spot welding quality based on an actually verified result obtained by verifying an actually welded workpiece, update the estimation algorithm based on the changed estimate; and
  when the processor does not receive the correction changing the estimate of the spot welding quality, update the estimation algorithm based on the estimate.

2. The spot welding quality check system as set forth in claim 1,
  wherein the displacement detector is an encoder which detects driving of the actuator.

3. The spot welding quality check system as set forth in claim 1, wherein the displacement detector is a strain gauge attached to at least one gun arm for holding the pair of electrodes.

* * * * *